April 30, 1957 A. M. SWEETLAND 2,790,648
TILTING AXLE ASSEMBLY FOR LEVELLING FARM COMBINES
Filed Jan. 5, 1955 2 Sheets-Sheet 1
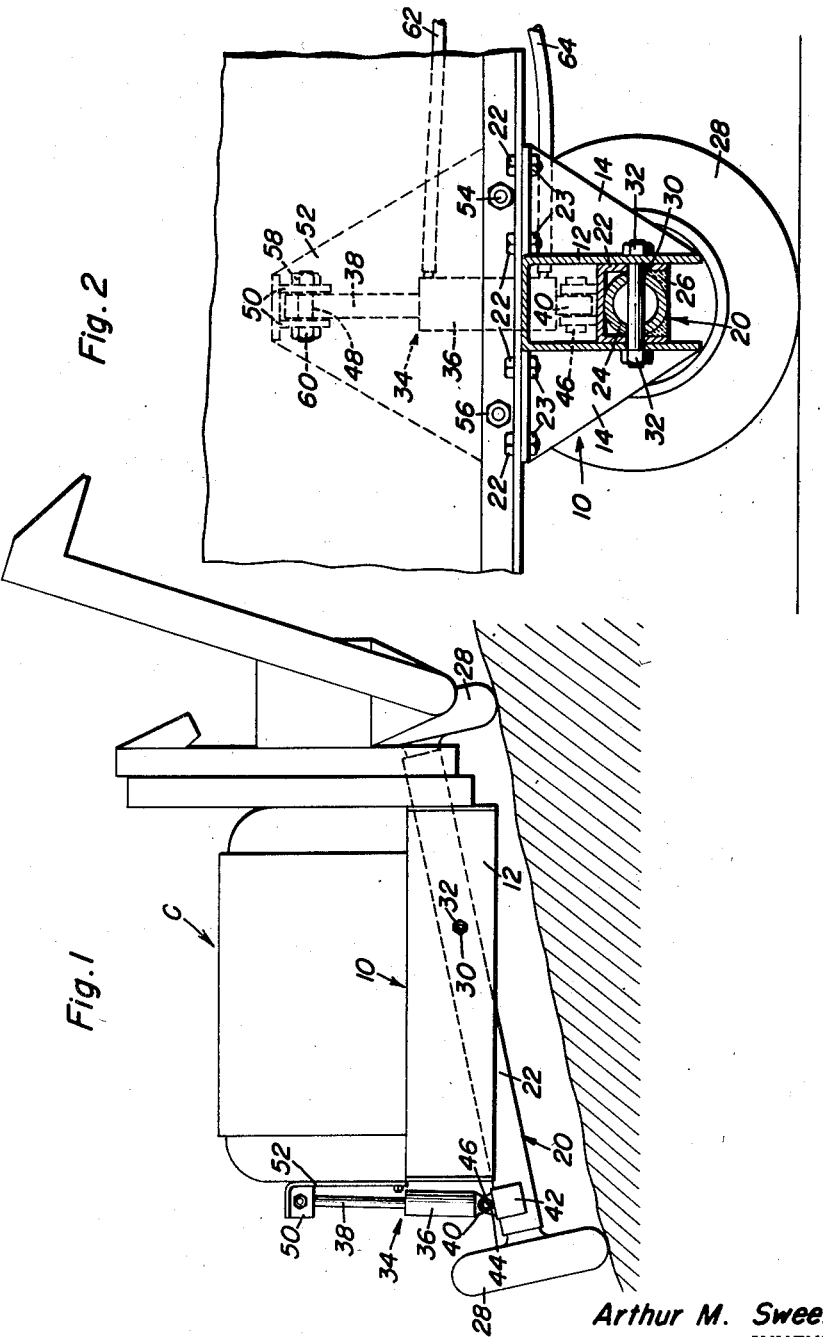
Arthur M. Sweetland
INVENTOR.

April 30, 1957  A. M. SWEETLAND  2,790,648
TILTING AXLE ASSEMBLY FOR LEVELLING FARM COMBINES
Filed Jan. 5, 1955  2 Sheets-Sheet 2

Arthur M. Sweetland
INVENTOR.

United States Patent Office 2,790,648
Patented Apr. 30, 1957

2,790,648

TILTING AXLE ASSEMBLY FOR LEVELLING FARM COMBINES

Arthur M. Sweetland, Tully, N. Y.

Application January 5, 1955, Serial No. 479,917

1 Claim. (Cl. 280—6)

This invention relates to agricultural equipment and more particularly to a tilting axle assembly for farm combines.

A primary object of the invention is the provision of an axle assembly including a wheeled axle unit for farm combines which can be vertically tilted to maintain the combine in a levelling position when utilized in harvesting on sloping terrain.

A further object of the invention is the provision of hydraulic operating means for tilting the wheeled axle unit relative to the combine body.

Another object of the invention is the provision of a tilting axle assembly which is readily incorporated on conventional combines designed for use only on level terrain.

And another object of the invention is the provision of a simple and sturdy tilting axle assembly for combines which is inexpensive to manufacture and is highly effective in operation and use.

And still another important object of invention in conformance with those set forth above is to provide means for maintaining the level position of the threshing and cleaning mechanism of a grain combine to provide a more even feed of the unthreshed grain into thresher mechanism than heretofore known, thereby providing more expedient delivery of threshed grain into a storage bin.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is an end elevation on a reduced scale of the farm combine and axle assembly in use on sloping terrain, the axle assembly being shown in tilted position whereby the combine body is maintained level;

Figure 2 is an enlarged fragmentary longitudinal cross sectional view through the axle assembly taken on the line 2—2 of Figure 3.

Figure 3:
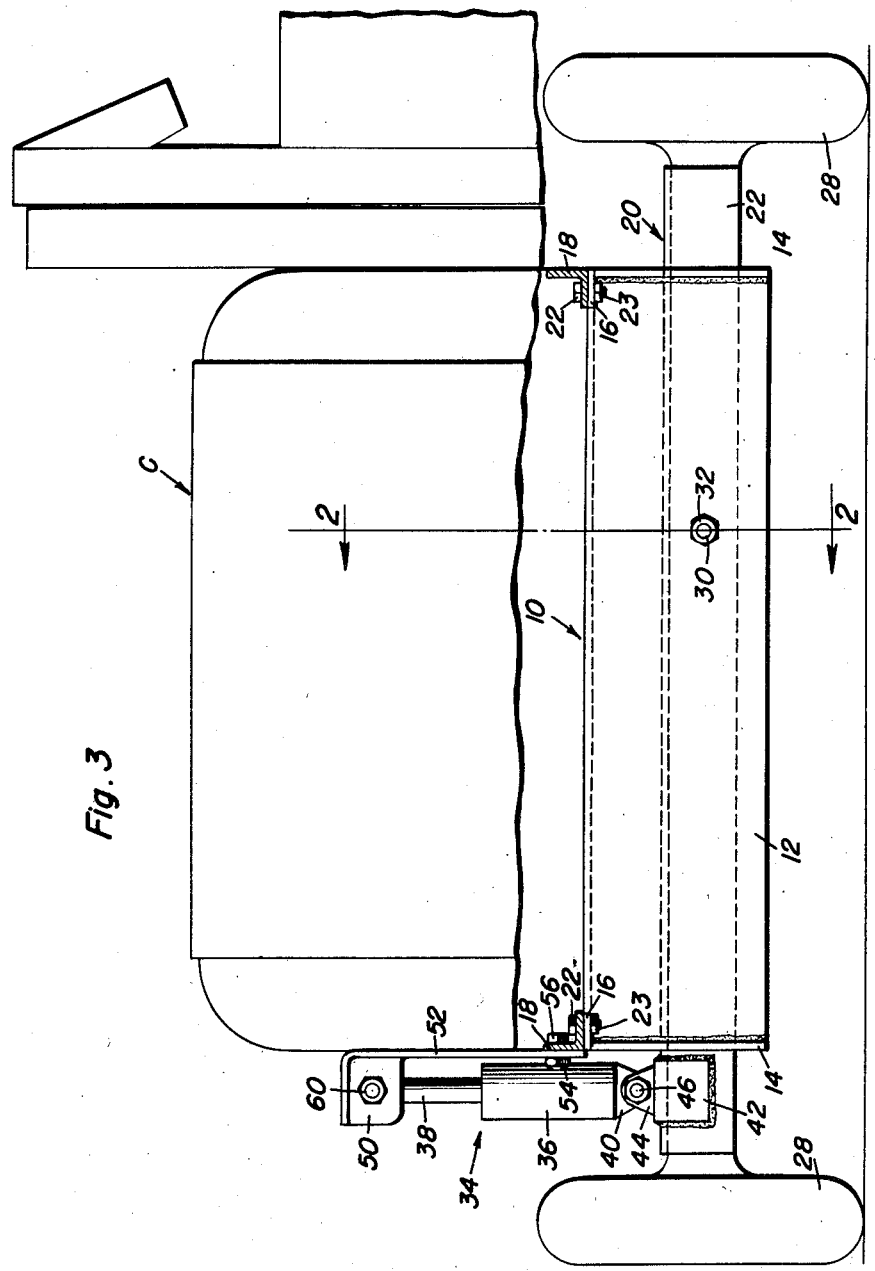
Figure 3 is an end elevation on an enlarged scale of the combine with the axle assembly in level position, portions of the combine body being broken away to illustrate the attachment of the axle assembly to the combine body.

The farm combine, indicated by the letter C, is of conventional construction not requiring further explanation. Attached to the undersurface of the combine body in transverse relationship thereto is the tilting axle assembly, generally indicated by the reference numeral 10.

The tilting axle assembly 10 comprises an inverted, outer U-shaped channel member 12 having parallel depending side walls connected by an upper web portion. The channel member 12 is provided with mounting brackets 14 vertically welded to the ends of the side walls of the channel member. The brackets 14 include upper flanges 16 extending flush with the upper face of the web portion of the channel 12 for detachably securing the channel to frame members 18 extending longitudinally at both sides of the combine body, as by bolts 22 and nuts 23 extending through aligned apertures in the flanges 16 and the frame members 18.

The axle unit proper, generally designated by the reference numeral 20, includes an inner U-shaped channel member 22 accommodated between the side walls of the outer channel member 12. Inner channel member 22 receives a tubular axle shaft 24, this axle shaft being secured in the inner channel member 22 in suitable fashion, as by welding 26. It will be noted that the ends of the inner channel member 22 extend outwardly from the ends of outer channel member 12 and the ends of the tubular axle shaft 24 in turn extend outwardly from the ends of inner channel member 22, wheels 28 being journalled on the extending ends of axle shaft 24.

A pivot pin 30 extends transversely through aligned apertures in the side walls of outer channel member 12 and the axle unit 20. The pivot pin 30 is provided with threaded outer end portions receiving retaining nuts 32 and by reason of this pivotal mounting, the axle unit 20 and wheels 28 carried thereby are capable of a vertical tilting movement within the outer channel member 12, the channel member 12 being of sufficient depth to permit a considerable range of tilting movement as illustrated in Figure 1.

To control the tilting movement of the axle unit 20 within the outer channel member 12, a hydraulic means generally indicated by the reference numeral 34 is attached between the axle unit 20 and the combine body. The hydraulic means 34 includes a cylinder 36 and a piston member 38. The cylinder 36 is provided with an apertured lug 40 at its lower end. A saddle-shaped bracket 42 is secured at one end of the inner channel member 22 of axle unit 20 and includes a pair of spaced upstanding apertured lugs 44. The apertured lug 40 of the cylinder 36 is positioned between the lugs 44 and pivoted thereto by a suitable fastener 46.

Correspondingly, the upper end of the piston member 38 is apertured as at 48 and this end is received between spaced apertured lugs 50 depending from a bracket member 52 which is detachably bolted to one of the frame members 18 of the combine body, as by bolts 54 and nuts 56. A bolt 58 and nut 60 serves to pivot the apertured upper end of the piston member 38 between the lugs 50 of the bracket member 52.

Flexible hydraulic conduits 62 and 64 are connected to the ends of the cylinder 36 at both sides of the piston portion of the piston member 38 and lead to the conventional hydraulic system and control means of a tractor, not shown, which is utilized to pull the combine. Although not shown, the flexible conduits may be connected to a hydraulic system contained in a combine which is in itself self-propelled, but incorporates the principles of this invention.

It is thus believed to be readily apparent that actuation of the hydraulic means 34 in a desired direction results in relative tilting movement between the combine body and the axle unit 20, whereby the combine body may be maintained level when utilized on sloping terrain. Inasmuch as the outer channel 12 and the bracket 52 which support on the elements of the tilting axle assembly are both detachably bolted to the frame members 18 of the combine body, the entire tilting axle assembly is readily adapted for attachment to conventional combines to convert them for use on sloping terrain.

The off-center location of pivot pin, as shown in Figures 2 and 3, further results in maintaining a low center of gravity of the combine during tilting movement while yet providing a sufficient range of tilting movement to suit the slopes of the terrain likely to be encountered in the use of the combine.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A tilting axle conversion attachment for side hill harvesters comprising a first elongated inverted U-shaped channel member removably secured transversely on the underside of a harvester, said channel member including an intermediate web terminating in a pair of depending side walls, an axle unit comprising a second elongated U-shaped channel, an axle shaft secured in said second U-shaped channel, end portions of said second U-shaped channel and axle shaft extending from opposite ends of the first U-shaped channel, wheels journaled on opposite ends of said axle shaft, a transverse pivot pin extending through the U-shaped channels and the axle shaft in spaced relation from the web of the first U-shaped channel permitting pivotal movement of said axle unit within said first channel, a pivot pin being located in off-center relationship relative to the center of the first channel and adjacent one end thereof, and hydraulic power means comprising a cylinder and piston rod assembly pivotally connected between the end portion of the second channel adjacent the other end of the first channel, said cylinder and piston rod assembly being pivotally secured to an overlying portion of the harvester for tilting the axle unit within the first channel member between the point of pivotal connection therewith and the web portion thereof.

References Cited in the file of this patent
UNITED STATES PATENTS

| | | |
|---|---|---|
| 1,156,395 | Dempsey | Oct. 12, 1915 |
| 1,176,817 | Deming | Mar. 28, 1916 |
| 2,293,328 | Coburn | Aug. 18, 1942 |
| 2,621,055 | O'Kelley | Dec. 9, 1952 |